US012555192B2

(12) United States Patent
Brown et al.

(10) Patent No.: US 12,555,192 B2
(45) Date of Patent: Feb. 17, 2026

(54) ROI WEIGHTED PLATEAU EQUALIZATION

(71) Applicant: BAE SYSTEMS Information and Electronic Systems Integration Inc., Nashua, NH (US)

(72) Inventors: Robin L Brown, Leominster, MA (US); Jaime A Caicedo Baquerizo, Somerville, MA (US); Gregory W Sletterink, Cambridge, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 437 days.

(21) Appl. No.: 18/102,865

(22) Filed: Jan. 30, 2023

(65) Prior Publication Data

US 2024/0257306 A1   Aug. 1, 2024

(51) Int. Cl.
  *G06T 5/40*   (2006.01)
  *G06T 5/90*   (2024.01)

(52) U.S. Cl.
  CPC ............... *G06T 5/40* (2013.01); *G06T 5/90* (2024.01); *G06T 2207/20024* (2013.01)

(58) Field of Classification Search
  CPC ... G06T 5/40; G06T 5/90; G06T 2207/20024; G06T 2207/20104; G06T 7/11; G06V 10/25; G06V 10/28
  See application file for complete search history.

(56) References Cited

U.S. PATENT DOCUMENTS 8,520,970 B2   8/2013   Strandemar
8,755,597 B1   6/2014   Tantalo (Continued)

FOREIGN PATENT DOCUMENTS

EP   2174291 B1   4/2017
EP   3683762 B1   3/2022

(Continued)

OTHER PUBLICATIONS

B. H. Zhang, J. j. Zhang, H. Xu, Z. Miao and F. Liu, "A Nonuniformity Correction Enhancement Method Based on Temporal Statistical for Infrared System," 2012 Symposium on Photonics and Optoelectronics, Shanghai, China, 2012, pp. 1-4, doi: 10.1109/SOPO.2012.6271002. (Year: 2012).*

(Continued)

*Primary Examiner* — Matthew C Bella
*Assistant Examiner* — Janice E. Vaz
(74) *Attorney, Agent, or Firm* — Maine Cernota & Curran; Gary McFaline

(57) ABSTRACT

A method of image enhancement, the method comprising: obtaining image data representing an image comprising a plurality of pixels, each having a pixel intensity value, the image further comprising a region of interest; analyzing image data associated with the region of interest and gathering relevant statistics thereon; analyzing image data associated with the image as a whole and gathering relevant statistics thereon; accumulating a histogram based on the intensity value of pixels in the image as a whole; defining histogram bins of interest that correspond to a range of pixel intensity values from within the region of interest; attenuating histogram bins outside of the bins of interest OR multiplying bins of interest by a scaling factor; using the attenuated or scaled histogram to create a cumulative distribution function; and using the cumulative distribution function to produce a contrast enhanced image.

20 Claims, 4 Drawing Sheets
(1 of 4 Drawing Sheet(s) Filed in Color)

(56) References Cited

U.S. PATENT DOCUMENTS

| | | |
|---|---|---|
| 9,471,970 B2 | 10/2016 | Strandmar |
| 9,947,086 B2 | 4/2018 | Lee |
| 9,990,706 B2 | 6/2018 | Olsen |
| 9,996,913 B2 | 6/2018 | Beck |
| 10,109,042 B2 | 10/2018 | Winzell |
| 10,694,101 B2 | 6/2020 | Olsson |
| 10,896,489 B1 | 1/2021 | Henry |
| 11,354,827 B2 | 6/2022 | Lu |
| 2012/0257808 A1 | 10/2012 | Spitzer |
| 2014/0079319 A1* | 3/2014 | Lin .......................... G06T 5/40 |
| | | 382/167 |
| 2015/0287174 A1 | 10/2015 | St. Romain, II |
| 2017/0078590 A1 | 3/2017 | Hogasten |
| 2018/0046878 A1* | 2/2018 | Wang ..................... G06V 10/44 |
| 2021/0217153 A1 | 7/2021 | Peng |
| 2022/0201239 A1 | 6/2022 | Price |

FOREIGN PATENT DOCUMENTS

| | | | |
|---|---|---|---|
| WO | 2004021264 A1 | 3/2004 | |
| WO | WO-2022094153 A1 * | 5/2022 | ........... A61B 5/1076 |

OTHER PUBLICATIONS

International Search Report, PCT/US24/13037, mailed Apr. 11, 2024, 14 pages.
Office Action for U.S. Appl. No. 18/102,872 mail date Jul. 17, 2025, 33 pages.

* cited by examiner

Example Histogram without Attenuation

Example CDF without Attenuation

Example Histogram with Attenuation

Example CDF with Attenuation

ROI WEIGHTED PLATEAU EQUALIZATION

FIELD OF THE DISCLOSURE

The following disclosure relates generally to image enhancement, and, more specifically, to Contrast Enhancement (CE) of IR images.

BACKGROUND

Infrared (IR) imaging, also referred to herein as thermal imaging, is commonly used in both military and commercial applications, such as surveillance cameras and night-vision systems in vehicles, to obtain visual information not otherwise detectable by the human eye. Unlike images captured by traditional cameras, however, IR images are typically low-contrast. That is, current IR sensors cannot clearly differentiate an object from its background when both have similar emissivity.

Contrast Enhancement (CE), which is the manipulation and redistributing of pixels in a linear or non-linear fashion to improve the separation of obscured structural variations in pixel intensity and create a more visually differentiable structural distribution, is widely used to improve image quality. Such techniques are especially useful when combined with IR imaging, due to these images typically being low-contrast.

One such CE technique, Plateau Equalization (PLTEQ) enhances image contrast by accumulating a histogram based on the intensity value of pixels in a Region of Interest (ROI), a defined area of an image frame. The histogram of the image may then be clipped with a plateau limit to avoid over enhancement. The plateau limit may be derived from the average of the mean and the median pixel intensity values. PLTEQ then uses the histogram to create a Cumulative Distribution Function (CDF), which can be used as a Look-Up Table (LUT) (i.e. a transform function) for incoming pixels to produce a contrast enhanced image. The histogram, however, does not take into account or otherwise have an understanding of what is important, or not, in an image. This can result in the enhancement of unimportant details and/or obscuring of important details.

Additionally, while the ROI used in conducting PLTEQ is typically configurable in size and position, and, in theory, could be used to identify an important portion of the image and enhance the overall image such that the important details are well-enhanced, it is most often nearly the full size of the image. This is because when the ROI is reduced to a relatively small area, the resulting, contrast-enhanced image tends to be blown out, with many full black and full white pixels.

While there are CE techniques, such as Contrast Limited Adaptive Histogram Equalization (CLAHE), that allow for multiple CE regions of interest, these techniques are not viable for many applications, due to their need for more significant computing resources, such as FPGA logic elements, than are commonly available on current imaging systems.

What is needed, therefore, are systems and methods of CE that that allow the enhancement of an image while preventing important details thereof from being obscured or otherwise made less visually differentiable and while retaining at least some contrast outside of the most important area thereof, allowing background details to be observed, while keeping resource utilization low enough to allow use on low Size, Weight, Power, and Cost (SWaP-C) devices.

SUMMARY

ROI-Weighted Plateau Equalization (RW-PLTEQ), as disclosed herein, is an enhancement to the Plateau Equalization (PLTEQ) technique, which is sometimes also referred to as or is similar to Histogram Equalization (HE), Adaptive Histogram Equalization (AHE), or Contrast Limited Adaptive Histogram Equalization (CLAHE).

More specifically, RW-PLTEQ, in embodiments, allows an operator to select a Region of Interest (ROI), which may be a relatively small region near the center of the image. The minimum and maximum pixel intensity values from the RW-PLTEQ ROI are then determined and used to define Bins of Interest (BOI) within a typical PLTEQ histogram comprising a plurality of bins. The histogram bins that are not BOI are then attenuated, causing the BOI to become more heavily weighted by comparison. Alternatively, histogram bins that are BOI may be scaled up, also causing the BOI to become more heavily weighted by comparison. PLTEQ is then performed, in embodiments, in the standard manner to create a CDF, which functions as a Look-Up Table (LUT) (i.e. a transform function) for incoming pixels, to produce a contrast enhanced image.

One embodiment of the present disclosure provides a method of image enhancement, the method comprising: obtaining image data representing an image comprising a plurality of pixels, each having a pixel intensity value, the image further comprising a region of interest; analyzing image data associated with the region of interest and gathering relevant statistics thereon; analyzing image data associated with the image as a whole and gathering relevant statistics thereon; accumulating a histogram based on the intensity value of pixels in the image as a whole; defining histogram bins of interest that correspond to a range of pixel intensity values from within the region of interest; attenuating histogram bins outside of the bins of interest OR multiplying bins of interest by a scaling factor; using the attenuated or scaled histogram to create a cumulative distribution function; and using the cumulative distribution function to produce a contrast enhanced image.

Another embodiment of the present disclosure provides such a method wherein the histogram is clipped prior to attenuation and wherein the clipped value corresponds to a percentage of a peak of the histogram or a fixed value passed by a user.

A further embodiment of the present disclosure provides such a method, wherein filtering and/or correction of image data by a digital filtering module and/or non-uniformity correction module, respectively, is performed between obtaining image data and analyzing the region of interest.

A yet further embodiment of the present disclosure provides such a method, wherein the non-uniformity correction module is configured to measure the radiation from optics used to create the image data and then adjust gain and offset for each pixel to correct for any non-uniformities detected.

A still further embodiment of the present disclosure provides such a method, wherein the digital image filtering module is used to perform a task selected from the group consisting of smoothing the image data by suppressing high frequencies, enhancing edges in the image data by enhancing high frequencies, and reducing noise in the image data by averaging pixel intensity values.

An even further embodiment of the present disclosure provides such a method, wherein clipping the histogram using a plateau limit is performed between attenuating histogram bins outside of the ROI and using the clipped, attenuated histogram to create a CDF.

A still yet further embodiment of the present disclosure provides such a method, wherein the region of interest is a small, static region near the center of the image.

An even still yet embodiment of the present disclosure provides such a method, further comprising a user controlling the position of the region of interest using an input device.

A still even another embodiment of the present disclosure provides such a method, wherein the input device is a directional pad or joystick.

An even yet further embodiment of the present disclosure provides such a method, further comprising the user controlling the size of the region of interest using the input device.

A still even yet further embodiment of the present disclosure provides such a method, wherein the input device is a directional pad or joystick.

A still even yet another embodiment of the present disclosure provides such a method, wherein minimum and maximum pixel intensity values from within the region of interest are used to define lower and upper histogram bins of interest.

An even still another embodiment of the present disclosure provides such a method, wherein the image is an infrared image.

An even another embodiment of the present disclosure provides such a method, wherein image data is analyzed during an inter-frame gap time.

One embodiment of the present disclosure provides a computer program product including one or more machine-readable mediums encoded with instructions that when executed by one or more processors cause a process to be carried out for image enhancement, the process comprising: obtaining image data representing an image comprising a plurality of pixels, each having a pixel intensity value, the image further comprising a region of interest; analyzing image data associated with the region of interest and gathering relevant statistics thereon; analyzing image data associated with the image as a whole and gathering relevant statistics thereon; accumulating a histogram based on the intensity value of pixels in the image as a whole; defining histogram bins of interest that correspond to a range of pixel intensity values from within the region of interest; attenuating histogram bins outside of the bins of interest OR multiplying bins of interest by a scaling factor; using the attenuated or scaled histogram to create a cumulative distribution function; and using the cumulative distribution function to produce a contrast enhanced image.

Another embodiment of the present disclosure provides such a computer program product, wherein minimum and maximum pixel intensity values from within the region of interest are used to define upper and lower histogram bins of interest.

A further embodiment of the present disclosure provides such a computer program product, wherein the histogram is clipped prior to attenuation or scaling and wherein the clipped value corresponds to a percentage of a peak of the histogram or a fixed value passed by a user.

One embodiment of the present disclosure provides a system for image enhancement, the system comprising: a histogram module configured to obtain image data representing an image comprising a plurality of pixels as well as pixel intensity values associated with each pixel and to accumulate a histogram based on the pixel intensity values; an RW-PLTEQ module configured to receive the histogram from the histogram module and to define histogram bins of interest that correspond to a range of pixel intensity values from within a region of interest and to attenuate histogram bins outside of the bins of interest OR to multiply bins of interest by a scaling factor, creating a modified histogram; and a cumulative distribution function module configured to receive the modified histogram, to create a cumulative distribution function using the modified histogram, and to output contrast enhanced image data by using the cumulative distribution function as a transform function for incoming pixels.

Another embodiment of the present disclosure provides such a system, wherein minimum and maximum pixel intensity values from within the region of interest are used to define upper and lower histogram bins of interest.

A further embodiment of the present disclosure provides such a system, wherein RW-PLTEQ module is further configured to clip the histogram prior to attenuation and wherein the histogram is clipped by an amount that corresponds to a percentage of a peak of the histogram or by a fixed value passed by a user.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features of the present embodiments will be understood better by reading the following detailed description, taken together with the figures herein described.

The accompanying drawings are not intended to be drawn to scale. For purposes of clarity, not every component may be labeled in every drawing.

DETAILED DESCRIPTION

The present disclosure provides a solution to limitations currently present in Contrast Enhancement (CE) systems and techniques, as described in the preceding background section. Embodiments of the present disclosure solve these limitations by providing what is herein referred to as ROI-Weighted Plateau Equalization (RW-PLTEQ).

More specifically, RW-PLTEQ is an enhancement to Plateau Equalization (PLTEQ), which is sometimes also referred to as or is similar to Histogram Equalization (HE), Adaptive Histogram Equalization (AHE), or Contrast Limited Adaptive Histogram Equalization (CLAHE). PLTEQ accumulates a histogram based on the intensity value of pixels in a frame. The histogram of the image may then be clipped with a plateau limit, for instance to avoid over enhancement. The plateau limit may be derived from the average of the mean and the median pixel intensity values, as a percentage of a peak of the histogram, or as a fixed value passed by a user. PLTEQ then uses the clipped histogram to create a Cumulative Distribution Function (CDF), which can be used as a Look-Up Table (LUT) (i.e. a transform function) for incoming pixels to produce a contrast enhanced image. This histogram, however, treats all pixel intensity values as equally important, since it has no way of knowing which elements in an image are important.

Figure 1:
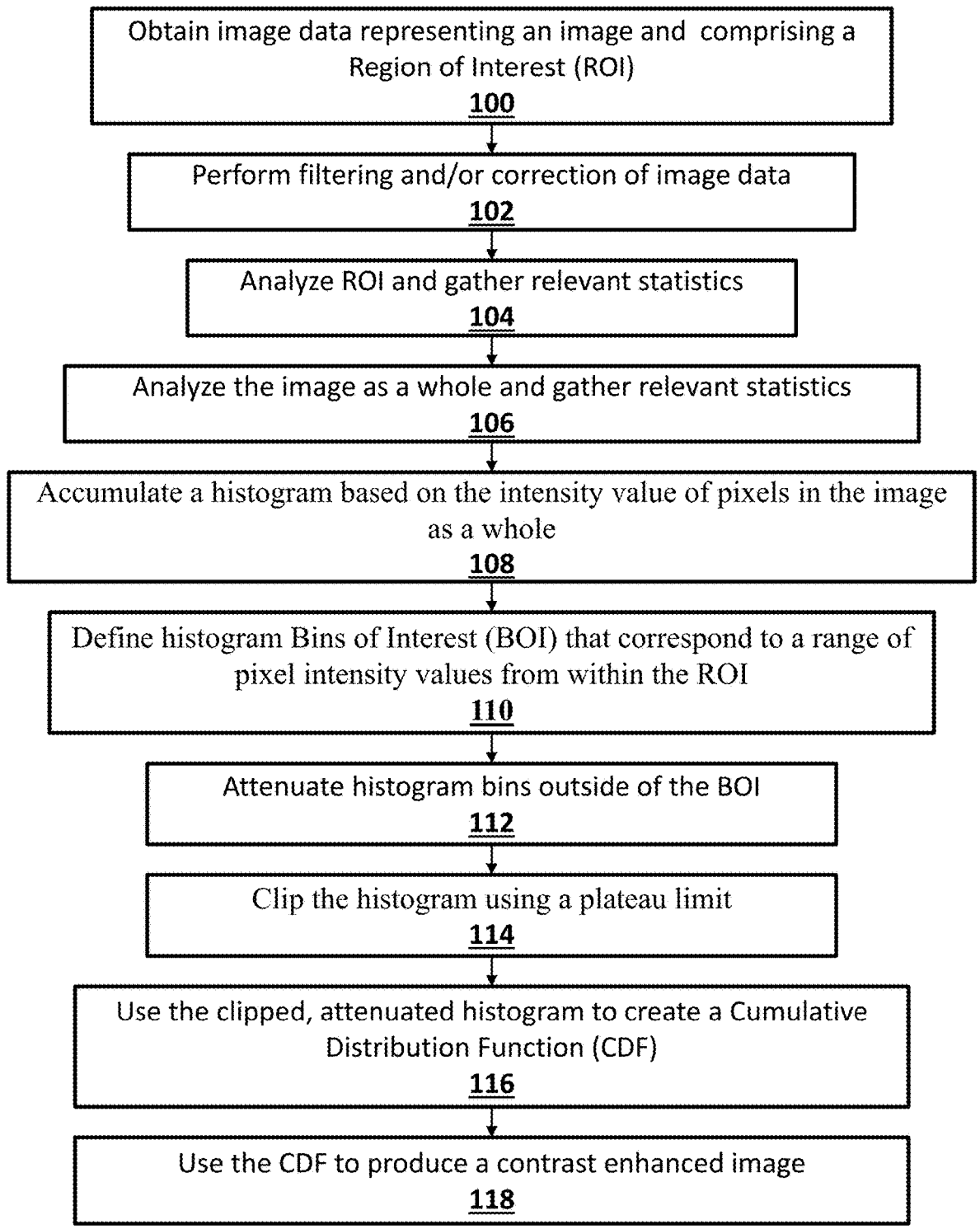
FIG. 1 is a flowchart describing a method of CE, in accordance with embodiments of the present disclosure.

RW-PLTEQ provides PLTEQ type CE of an image using a user-defined Region of Interest (ROI) that is weighted more highly than other portions of the image when performing CE. More specifically, as laid out in FIG. 1, RW-PLTEQ, in embodiments, comprises the following steps: obtaining image data, such as from an image pipeline or Focal Plane Array (FPA), comprising a Region of Interest (ROI) 100; analyzing the ROI and gathering relevant statistics, such as range of pixel intensity values, average pixel intensity values, standard deviation of pixel intensity values, etc., thereon 104; analyzing the image as a whole and gathering relevant statistics, such as range of pixel intensity values, average pixel intensity values, standard deviation of pixel intensity values, etc., thereon 106; accumulating a histogram based on the intensity value of pixels in the image as a whole 108; defining histogram Bins of Interest (BOI) that correspond to a range of pixel intensity values from within the ROI 110; attenuating histogram bins outside of the BOI 112; clipping the histogram using a plateau limit 114; using the clipped, attenuated histogram to create a CDF 116; and using the CDF to produce a contrast enhanced image 118.

In embodiments, filtering and/or correction of image data 102, such as by a digital filtering module and/or Non-Uniformity Correction (NUC) module is performed between obtaining image data 100 and analyzing the ROI 104.

In embodiments employing a NUC module, the NUC module may be used to adjust for detector drift that occurs as the scene and environment change and to correct for interference cause by heat generated by a camera used to generate the image data. In such embodiments, the NUC module is configured to measure the radiation from the camera's own optics and then adjust the image data based on those readings. Even more specifically, the NUC module of embodiments is configured to adjust gain and offset for image data associated with each pixel, producing a higher quality, more accurate image.

In embodiments comprising a digital image filtering module, the digital image filtering module may be used to smooth the image by suppressing high frequencies, enhance edges in the image by enhancing high frequencies, reduce noise by averaging pixel intensity values, or perform other types of filtering, as would be known to one of ordinary skill in the art.

In embodiments, clipping the histogram using a plateau limit 114 is performed between attenuating histogram bins outside of the ROI 112 and using the clipped, attenuated histogram to create a CDF 116.

In embodiments, the ROI is a small, static region near the center of the image representing what a user is likely focused on and the user is able to control the position of the ROI by aiming the device capturing the image, such as by aiming the device at an important feature. In other embodiments, the user can control the ROI's position and, in embodiments, size within the image using a directional pad, joystick, or similar controller or input device, as would be known to one of ordinary skill in the art.

In embodiments, RW-PLTEQ uses the minimum and maximum pixel intensity values from the RW-PLTEQ ROI to define lower and upper Histogram Bins of Interest (BOI), respectively. RW-PLTEQ then attenuates the remaining histogram bins, giving the BOI more weight when PLTEQ creates the CDF.

In other embodiments, the BOI bins are multiplied by a scale factor, however, this approach requires an increase in downstream bit-widths of registers used for PLTEQ summations and other related activities, which is avoided by attenuating non-BOI histogram bins.

In embodiments, the image is an IR image.

In embodiments, a line buffer is used to delay and store pixels, in embodiments by ~5 lines, so that they can be processed.

In embodiments, images are analyzed during an interframe gap time, the idle time between any given two frames.

These techniques allow the enhancement of an image while preventing important details thereof, as communicated by the user, from being obscured or otherwise made less visually differentiable.

Figure 2A:
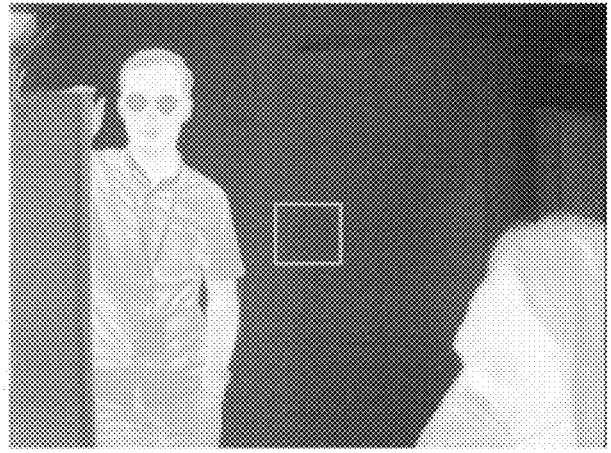
FIG. 2A is a contrast-enhanced image having an ROI that is centered on a background of the image and FIG. 2B is contrast-enhanced image of the same scene as shown in FIG. 2A where the ROI is centered on an individual in the foreground of the image, these figures showing the change in Contrast Enhancement (CE) caused by the difference in the range of pixel intensity values disposed within the ROI, in accordance with embodiments of the present disclosure.
Figure 2B:

Now referring to FIGS. 2A and 2B, FIG. 2A is an image where the ROI is centered on a background of the image and FIG. 2B is the same image as FIG. 2A, taken under similar conditions, with the ROI centered on an individual in the foreground of the image. A comparison of these images clearly shows details of the portion of each image within the ROI being enhanced, rendering them more visually differentiable, while portions of the image outside of the ROI also remain visually differentiable.

Figure 3A:
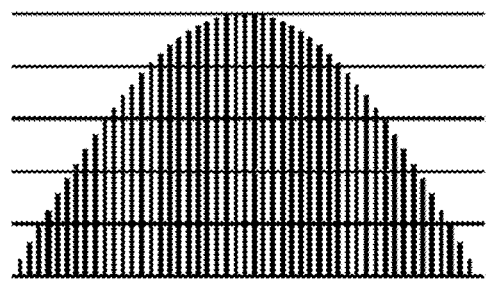
FIG. 3A consists of a histogram and Cumulative Distribution Function (CDF) associated with an image and FIG. 3B consists of a histogram and CDF associated with the same image as FIG. 3A where bins other than Bins of Interest (BOI) have been attenuated, in accordance with embodiments of the present disclosure.
Figure 3A:
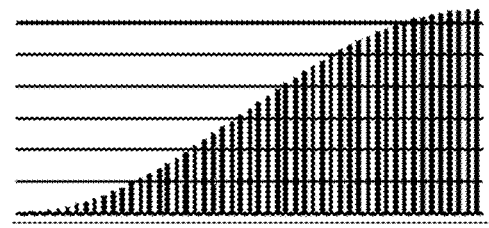
Figure 3B:
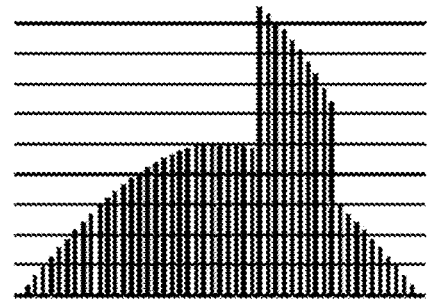
Figure 3B:
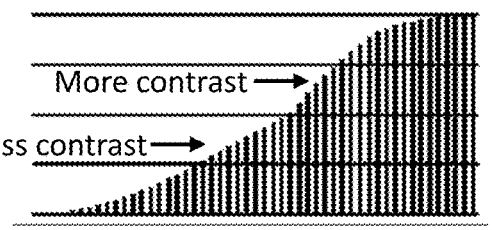

FIGS. 3A and 3B show a histogram and associated CDF before and after attenuation, respectively. More specifically, where pixels outside of the BOI are attenuated, a slope of the CDF is likely to be steeper within the BOI and shallower outside of the BOI. In embodiments, the BOI are defined by the minimum and maximum pixel intensity values within the ROI.

Figure 4:
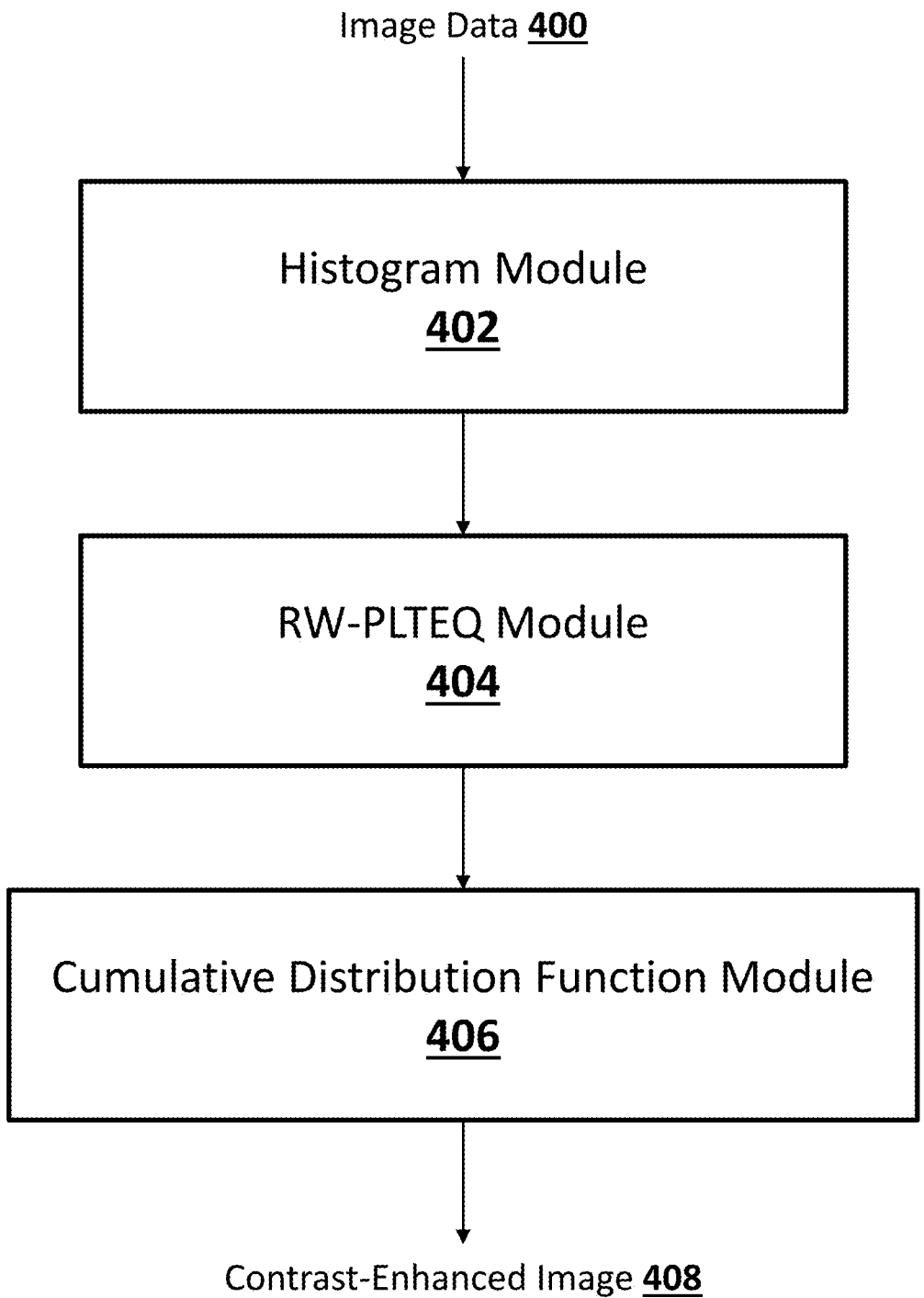
FIG. 4 is a flowchart describing the CE process, in accordance with embodiments of the present disclosure.

Referring to FIG. 4, this Figure provides a flowchart describing the CE process, in accordance with embodiments of the present disclosure. More specifically, image data 400 is provided to a histogram module 402 that is configured to accumulate a histogram based on the intensity value of pixels in the image data 400. The histogram module 402 then provides the histogram to an RW-PLTEQ module 404 that is configured to define histogram Bins of Interest (BOI) that correspond to a range of pixel intensity values from within the ROI; attenuate histogram bins outside of the BOI; and, in embodiments, clip the histogram using a plateau limit. The Cumulative Distribution Function (CDF) module 406 is then configured to create a CDF using the histogram and to output contrast enhanced image 408 data by using the CDF as a Look-Up Table (LUT) (i.e. a transform function) for incoming pixels.

Referring back to FIG. 3A, this figure shows a typical histogram of image data 400 and associated CDF. In FIG. 3B, the histogram (i.e. top) portion shows the histogram bins after attenuation of bins other than BOI by the RW-PLTEQ module 404, in accordance with embodiments of the present disclosure. The CDF of FIG. 3B then shows how the CDF without attenuation of bins outside of the BOI differs from the CDF created in accordance with embodiments of the present disclosure.

Lastly, while reference is made to "images" throughout the present disclosure, this does not exclude video from being processed using the systems and methods described herein, with images referring to frames of a video, which, in embodiments, is a real-time or substantially real-time video. As used herein, a 'module' refers to a component configured to perform a specified task or series of tasks. Modules can take the form of software having a set of instructions, routines, or functions configured to perform the module's specified task or tasks. Modules can also take the form of hardware having components arranged in a particular manner in order to perform the module's tasks. Modules may also take the form of a combination of software and hardware components.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A method of image enhancement, the method comprising:
   obtaining image data representing an image comprising a plurality of pixels, each having a pixel intensity value, the image further comprising a region of interest;
   analyzing image data associated with the region of interest and gathering relevant statistics thereon;
   analyzing image data associated with the image as a whole and gathering relevant statistics thereon;
   accumulating a histogram based on the intensity value of pixels in the image as a whole;
   defining histogram bins of interest that correspond to a range of pixel intensity values from within the region of interest;
   attenuating histogram bins outside of the bins of interest OR multiplying bins of interest by a scaling factor;
   using the attenuated or scaled histogram to create a cumulative distribution function; and
   using the cumulative distribution function to produce a contrast enhanced image.

2. The method of claim 1, wherein the histogram is clipped prior to attenuation and wherein the clipped value corresponds to a percentage of a peak of the histogram or a fixed value passed by a user.

3. The method of claim 1, wherein filtering and/or correction of image data by a digital filtering module and/or non-uniformity correction module, respectively, is performed between obtaining image data and analyzing the region of interest.

4. The method of claim 3, wherein the non-uniformity correction module is configured to measure the radiation from optics used to create the image data and then adjust gain and offset for each pixel to correct for any non-uniformities detected.

5. The method of claim 3, wherein the digital image filtering module is used to perform a task selected from the group consisting of smoothing the image data by suppressing high frequencies, enhancing edges in the image data by enhancing high frequencies, and reducing noise in the image data by averaging pixel intensity values.

6. The method of claim 1, wherein clipping the histogram using a plateau limit is performed between attenuating histogram bins outside of the ROI and using the clipped, attenuated histogram to create a CDF.

7. The method of claim 1, wherein the region of interest is a small, static region near the center of the image.

8. The method of claim 1, further comprising a user controlling the position of the region of interest using an input device.

9. The method of claim 8, wherein the input device is a directional pad or joystick.

10. The method of claim 8, further comprising the user controlling the size of the region of interest using the input device.

11. The method of claim 10, wherein the input device is a directional pad or joystick.

12. The method of claim 1, wherein minimum and maximum pixel intensity values from within the region of interest are used to define lower and upper histogram bins of interest.

13. The method of claim 1, wherein the image is an infrared image.

14. The method of claim 1, wherein image data is analyzed during an inter-frame gap time.

15. A computer program product stored on one or more non-transitory machine-readable mediums encoded with instructions that when executed by one or more processors cause a process to be carried out for image enhancement, the process comprising:
   obtaining image data representing an image comprising a plurality of pixels, each having a pixel intensity value, the image further comprising a region of interest;
   analyzing image data associated with the region of interest and gathering relevant statistics thereon;
   analyzing image data associated with the image as a whole and gathering relevant statistics thereon;
   accumulating a histogram based on the intensity value of pixels in the image as a whole;
   defining histogram bins of interest that correspond to a range of pixel intensity values from within the region of interest;
   attenuating histogram bins outside of the bins of interest OR multiplying bins of interest by a scaling factor;
   using the attenuated or scaled histogram to create a cumulative distribution function; and
   using the cumulative distribution function to produce a contrast enhanced image.

16. The computer program product of claim 15, wherein minimum and maximum pixel intensity values from within the region of interest are used to define upper and lower histogram bins of interest.

17. The computer program product of claim 15, wherein the histogram is clipped prior to attenuation or scaling and wherein the clipped value corresponds to a percentage of a peak of the histogram or a fixed value passed by a user.

18. A system for image enhancement, the system comprising:
- a histogram module configured to obtain image data representing an image comprising a plurality of pixels as well as pixel intensity values associated with each pixel and to accumulate a histogram based on the pixel intensity values;
- an RW-PLTEQ module configured to receive the histogram from the histogram module and to define histogram bins of interest that correspond to a range of pixel intensity values from within a region of interest and to attenuate histogram bins outside of the bins of interest OR to multiply bins of interest by a scaling factor, creating a modified histogram; and
- a cumulative distribution function module configured to receive the modified histogram, to create a cumulative distribution function using the modified histogram, and to output contrast enhanced image data by using the cumulative distribution function as a transform function for incoming pixels.

19. The system for image enhancement of claim 18, wherein minimum and maximum pixel intensity values from within the region of interest are used to define upper and lower histogram bins of interest.

20. The system for image enhancement of claim 18, wherein RW-PLTEQ module is further configured to clip the histogram prior to attenuation and wherein the histogram is clipped by an amount that corresponds to a percentage of a peak of the histogram or by a fixed value passed by a user.

* * * * *